US011245150B2

(12) United States Patent
Lee

(10) Patent No.: US 11,245,150 B2
(45) Date of Patent: Feb. 8, 2022

(54) RECHARGEABLE BATTERY

(71) Applicant: Samsung SDI Co., Ltd., Yongin-si (KR)

(72) Inventor: Hyunsoo Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 71 days.

(21) Appl. No.: 16/480,664

(22) PCT Filed: Feb. 5, 2018

(86) PCT No.: PCT/KR2018/001477
§ 371 (c)(1),
(2) Date: Jul. 24, 2019

(87) PCT Pub. No.: WO2018/147603
PCT Pub. Date: Aug. 16, 2018

(65) Prior Publication Data
US 2019/0363316 A1    Nov. 28, 2019

(30) Foreign Application Priority Data

Feb. 10, 2017    (KR) .......................... 10-2017-0018708

(51) Int. Cl.
*H01M 50/477* (2021.01)
*H01M 50/155* (2021.01)
(Continued)

(52) U.S. Cl.
CPC ....... *H01M 50/155* (2021.01); *H01M 50/172* (2021.01); *H01M 50/394* (2021.01);
(Continued)

(58) Field of Classification Search
CPC .... H01M 2/0482; H01M 2/06; H01M 2/1264; H01M 2/26; H01M 2/30; H01M 2/36;
(Continued)

(56) References Cited

U.S. PATENT DOCUMENTS 6,004,692 A * 12/1999 Muffoletto .......... H01M 50/543
429/163
6,165,637 A * 12/2000 Azema ................ H01M 2/1241
429/57
(Continued)

FOREIGN PATENT DOCUMENTS

JP    2015-032386 A    2/2015
JP    5742869 B2    7/2015
(Continued)

OTHER PUBLICATIONS

Korean Office action for Application No. 10-2017-0018708, dated May 24, 2021, 6 pages.
(Continued)

*Primary Examiner* — Christina Chern
(74) *Attorney, Agent, or Firm* — Lewis Roca Rothgerber Christie LLP

(57) ABSTRACT

A rechargeable battery according to an exemplary embodiment of the present invention includes: an electrode assembly provided with a non-coated area tab that protrudes to one side of a coated area; a case provided with an opening at one side thereof to receive the electrode assembly; a cap plate coupled and welded to the opening; an electrode terminal provided in the cap plate and electrically connected to the non-coated area tab; and an insulation sheet disposed between the cap plate and the electrode assembly, and bent toward a direction crossing the cap plate at opposite ends of the inside of the cap plate and insulating the electrode assembly, wherein the insulation sheet includes a spacing portion that is distanced from a side corner of a welding line of the cap plate and the case.

10 Claims, 8 Drawing Sheets

(51) Int. Cl.
*H01M 50/60* (2021.01)
*H01M 50/172* (2021.01)
*H01M 50/30* (2021.01)
*H01M 50/531* (2021.01)
*H01M 50/543* (2021.01)

(52) U.S. Cl.
CPC ....... *H01M 50/477* (2021.01); *H01M 50/531* (2021.01); *H01M 50/543* (2021.01); *H01M 50/60* (2021.01)

(58) Field of Classification Search
CPC ........ H01M 2/12; H01M 2/22; H01M 2/0426; H01M 2/0473; H01M 2/0217; H01M 2/263; H01M 10/0431; H01M 2/34; H01M 50/471; H01M 50/474; H01M 50/477; H01M 50/48; H01M 50/40; H01M 50/509; H01M 50/531; H01M 50/533; H01M 50/538; H01M 50/54; H01M 2/14; H01M 2/16; H01M 2/18; H01M 2/20; Y02E 60/10
See application file for complete search history.

(56) References Cited

U.S. PATENT DOCUMENTS

| | | | | |
|---|---|---|---|---|
| 2009/0111013 | A1* | 4/2009 | Jang | H01M 10/4235 |
| | | | | 429/163 |
| 2012/0003506 | A1* | 1/2012 | Shin | H01M 50/54 |
| | | | | 429/7 |
| 2012/0052371 | A1* | 3/2012 | Kim | H01M 2/0275 |
| | | | | 429/179 |
| 2012/0129012 | A1* | 5/2012 | Baek | H01M 2/0217 |
| | | | | 429/7 |
| 2012/0171525 | A1 | 7/2012 | Guen | |
| 2013/0084471 | A1 | 4/2013 | Han et al. | |
| 2015/0140417 | A1 | 5/2015 | Matsumoto et al. | |
| 2015/0255760 | A1 | 9/2015 | Kim et al. | |
| 2015/0349299 | A1 | 12/2015 | Yamada et al. | |
| 2015/0372261 | A1* | 12/2015 | Suzuki | H01M 2/0426 |
| | | | | 429/179 |
| 2016/0056495 | A1 | 2/2016 | Minagata et al. | |
| 2016/0099440 | A1 | 4/2016 | Park et al. | |
| 2016/0099444 | A1 | 4/2016 | Park et al. | |
| 2016/0099457 | A1 | 4/2016 | Park et al. | |
| 2018/0047971 | A1* | 2/2018 | Hirose | H01M 2/34 |
| 2019/0207173 | A1* | 7/2019 | Li | H01M 10/0431 |

FOREIGN PATENT DOCUMENTS

| | | |
|---|---|---|
| JP | 2015-225839 A | 12/2015 |
| KR | 10-1155889 B1 | 6/2012 |
| KR | 10-2012-0075849 A | 7/2012 |
| KR | 10-2013-0035163 A | 4/2013 |
| KR | 10-2015-0022851 A | 3/2015 |
| KR | 10-2015-0105849 A | 9/2015 |
| KR | 10-2016-0042243 A | 4/2016 |
| KR | 10-2016-0042244 A | 4/2016 |
| KR | 10-2016-0042245 A | 4/2016 |

OTHER PUBLICATIONS

Korean Notice of Allowance for Application No. 10-2017-0018708, dated Nov. 24, 2021, 2 pages.

* cited by examiner

RECHARGEABLE BATTERY

CROSS-REFERENCE TO RELATED APPLICATION(S)

This application is a National Phase Patent Application of International Patent Application Number PCT/KR2018/001477, filed on Feb. 5, 2018, which claims priority of Korean Patent Application No. 10-2017-0018708, filed Feb. 10, 2017. The entire contents of both of which are incorporated herein by reference.

TECHNICAL FIELD

The present disclosure relates to a rechargeable battery. More particularly, the present invention relates to a rechargeable battery provided with an insulation sheet that surrounds an electrode assembly in a case.

BACKGROUND ART

A rechargeable battery is a battery that repeatedly performs charging and discharging, differently from a primary battery. A rechargeable battery with small capacity is used in a small portable electronic device, such as a mobile phone, a notebook computer, and a camcorder, and a rechargeable battery with large capacity may be used as a motor driving power source for a hybrid vehicle and an electric vehicle.

For example, rechargeable batteries include an electrode assembly for charging and discharging, a case accommodating the electrode assembly and an electrolyte solution, a cap plate coupled to the opening of the case, an insulation sheet that surrounds the electrode assembly, and an electrode terminal that is provided in the cap plate and electrically connected to the electrode assembly via the insulation sheet.

The case is formed in the shape of a rectangular parallelepiped and the cap plate is formed in the shape of a quadrangular plate such that it is coupled to a quadrangular opening of the case, and they are connected with each other by welding at portions where they contact each other. The insulation sheet surrounds wide side surfaces and a top surface of the insulation sheet and is inserted into the case.

The insulation sheet is bent at opposite sides in a width direction of the cap plate, and thus a bent line is formed corresponding to a welding line at which the case and the cap plate are welded. The bent line forms a structure that protrudes toward the welding line.

Thus, when the cap plate is placed in the opening of the case and then the case and the cap plate are welded to each other, heat generated from the welding is transmitted into the case such that the bent line of the insulation sheet may be deformed or melted. The deformation or melting of the insulation sheet may cause exposure of a non-coated area tab connected to the electrode terminal, and the electrode assembly, to welding heat. Accordingly, the non-coated area tab and the electrode assembly may be short-circuited with the cap plate or the case.

DISCLOSURE

Technical Problem

Exemplary embodiments of the present invention have been made in an effort to provide a rechargeable battery that can prevent non-coated area tabs and an electrode assembly from being short-circuited with a cap plate or a case by stably maintaining an insulation sheet that surrounds the electrode assembly in the case.

Technical Solution

A rechargeable battery according to an exemplary embodiment of the present invention includes: an electrode assembly provided with a non-coated area tab that protrudes to one side of a coated area; a case provided with an opening at one side thereof to receive the electrode assembly; a cap plate coupled and welded to the opening; an electrode terminal provided in the cap plate and electrically connected to the non-coated area tab; and an insulation sheet disposed between the cap plate and the electrode assembly, and bent toward a direction crossing the cap plate at opposite ends of the inside of the cap plate and insulating the electrode assembly, wherein the insulation sheet includes a spacing portion that is distanced from a side corner of a welding line of the cap plate and the case.

The insulation sheet may include: an upper portion disposed between the cap plate and the electrode assembly; and a side portion bent from opposite ends in a width direction of the cap plate at the upper portion and thus disposed between a side surface of the electrode assembly and the case, and the spacing portion may connect the upper portion and the side portion and may be distanced from a side corner of the welding line.

The rechargeable battery according to the exemplary embodiment of the present invention may further include: a top insulator disposed between the electrode assembly and the insulation sheet and between the electrode assembly and the electrode terminal, wherein the top insulator may include a plate portion disposed on the electrode assembly, and an expansion portion extended toward the welding line from the width direction opposite ends of the plate portion.

The non-coated area tab may be welded to the electrode terminal via the expansion portion, and the spacing portion may be distanced toward the expansion portion from a side corner of the welding line.

The spacing portion may be support by the non-coated area tabs that surround the expansion portion.

In the insulation sheet, the upper portion may include: a first internal electrolyte injection opening corresponding to the electrolyte injection opening; a first internal vent hole corresponding to the vent hole; and an internal terminal hole corresponding to the electrode terminal.

The top insulator may include: a second internal electrolyte injection opening corresponding to the first internal electrolyte injection opening; and a second internal vent hole corresponding to the first internal vent hole.

The spacing portion may be distanced from the side corner of the welding line by as much as a curvature radius that has the side corner of the welding line as a center.

The spacing portion may be distanced from the side corner of the welding line by as much as a size of a triangle having the welding line as one vertex.

The spacing portion may be distanced from the side corner of the welding line by as much as a size of a quadrangle having the welding line as one vertex.

Advantageous Effects

According to the exemplary embodiment of the present invention, a spacing portion that is distanced from a side corner of a welding line of a cap plate and a case is provided in an insulation sheet that insulates an electrode assembly such that the insulation sheet and the spacing portion can be distanced from the side corner of the welding line while the cap plate is coupled to the case.

Thus, welding heat generated when the case and the cap plate are welded to each other cannot be transmitted to the insulation sheet and the spacing portion, and accordingly, a structure in which the insulation sheet surrounds the electrode assembly can be stably maintained.

That is, the insulation sheet can be safely protected from the welding heat. Accordingly, a non-coated area tab and the electrode assembly can be prevented from being short-circuited with the cap plate or the case.

MODE FOR INVENTION

Figure 1:
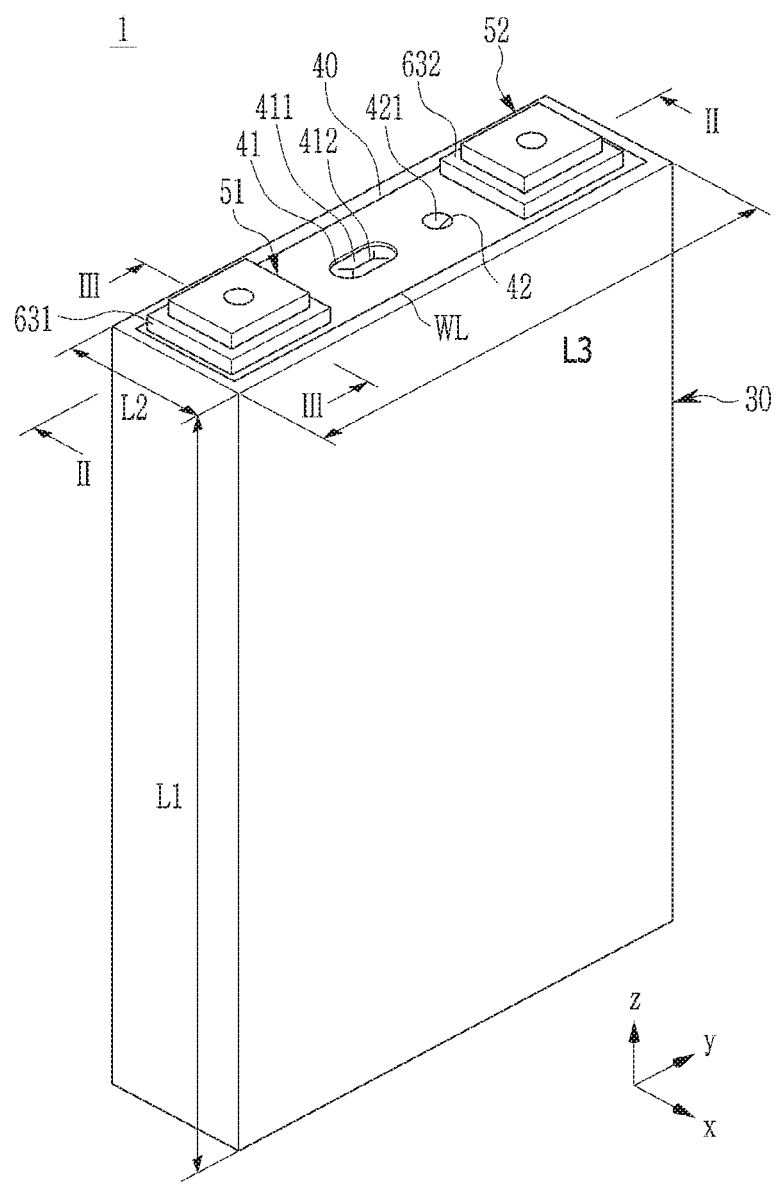
FIG. 1 is a perspective view of a rechargeable battery according to a first exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification.

Throughout this specification, it is to be understood that when one component is referred to as being 'directly connected to' another component, it may be connected to another component without the other component interposed therebetween. In addition, unless explicitly described to the contrary, the word "comprise" and variations such as "comprises" or "comprising" will be understood to imply the inclusion of stated elements but not the exclusion of any other elements.

Figure 2:
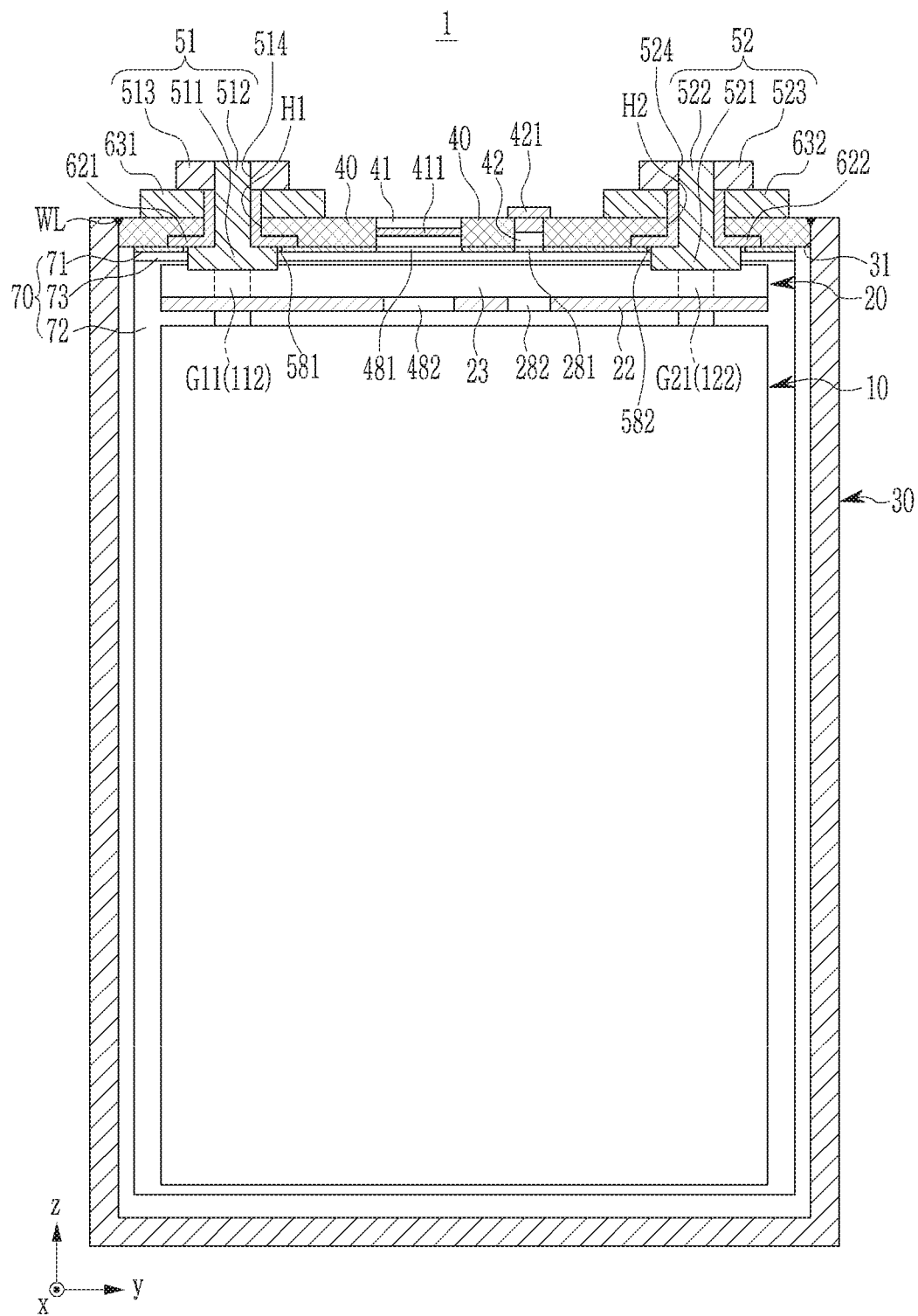
FIG. 2 is a cross-sectional view of FIG. 1, taken along the line II-II.
Figure 3:
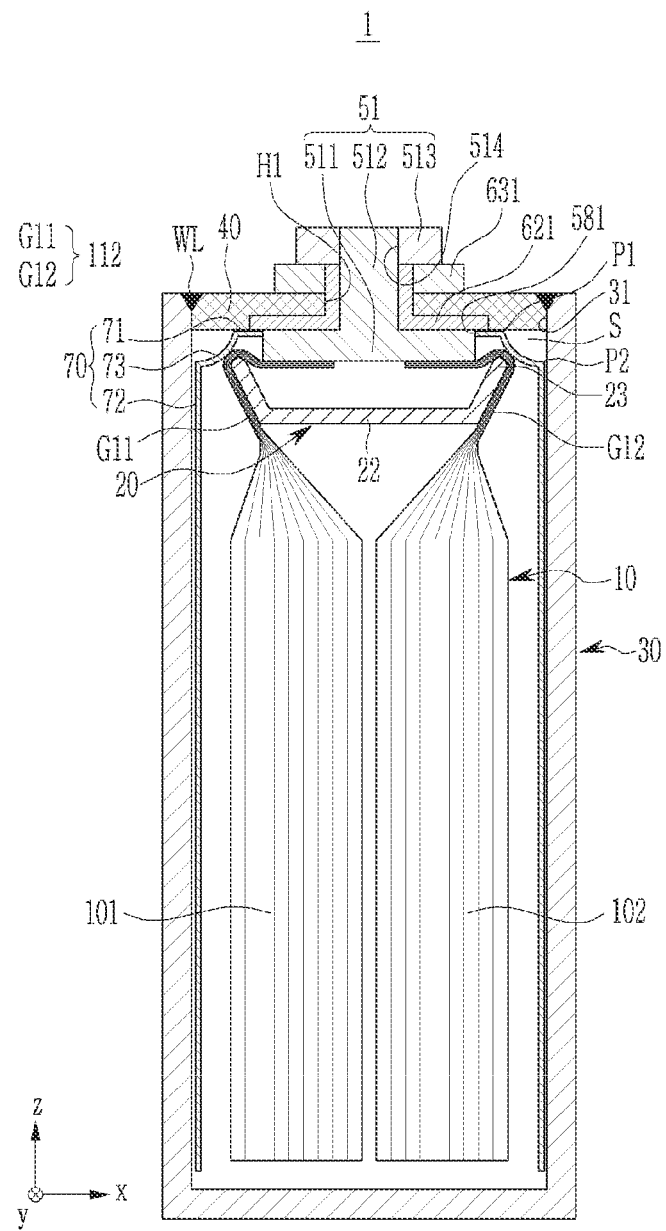
FIG. 3 is a cross-sectional view of FIG. 1, taken along the line III-III.

FIG. 1 is a perspective view of a rechargeable battery according to a first exemplary embodiment of the present invention, FIG. 2 is a cross-sectional view of FIG. 1, taken along the line II-II, and FIG. 3 is a cross-sectional view of FIG. 1, taken along the line III-III.

Referring to FIG. 1 to FIG. 3, a rechargeable battery 1 according to a first exemplary embodiment includes an electrode assembly 10 that charges and discharges a current, a case 30 where the electrode assembly 10 and an electrolyte solution are installed, a cap plate 40 coupled to an opening 31 of the case 30 and closes and seals the opening 31, and electrode terminals 51 and 52 that are provided in terminal holes H1 and H2 of the cap plate 40 and are electrically connected to the electrode assembly 10.

For example, the case 30 and the cap plate 40 are formed of aluminum, and they are welded in the opening 31 such that a welding line WL is formed. That is, the case 30 and the cap plate 40 may be welded by a laser in the opening 31.

The case 30 sets an internal space for receiving the plate-shaped electrode assembly 10 and the electrolyte solution, and has a predetermined first length (height) L1 in a first direction (z-axis direction, the height direction of the case). For example, the case 30 is approximately formed in the shape of a rectangular parallelepiped, and has the opening 31 at one side for insertion of the electrode assembly 10.

The cap plate 40 has a second length (width) set in a second direction (x-axis direction, a width direction of the cap plate) that crosses the first direction (z-axis direction), and a third length (length) L3 set in a third direction (y-axis direction, a length direction of the cap plate) that is shorter than the first length (height) L1 and crosses the second direction so as to be coupled corresponding to the opening 31 of the case 30 to thereby close and seal the case 30.

In addition, the cap plate 40 is provided with a vent hole 41 and an electrolyte injection opening 42. The vent hole 41 is closed and sealed by a vent plate 411 such that an internal pressure formed by a gas and a temperature increase generated inside the rechargeable battery due to charging and discharging of the electrode assembly 10 can be discharged.

When the internal pressure of the rechargeable battery reaches a predetermined pressure level, the vent plate 411 is ruptured and the vent hole 41 is opened such that the gas and the internal pressure generated from the inside can be discharged. The vent plate 411 includes a notch 412 that induces a rupture.

After the cap plate 40 is coupled and welded to the case 30, the electrolyte injection opening 42 enables the electrolyte solution to be injected into the cap plate 40 and the case 30. After injection of the electrolyte solution, the electrolyte injection opening 42 is sealed by a sealing cap 421.

In addition, the rechargeable battery further includes an insulation sheet 70 that insulates the electrode assembly 10, and a top insulator 20 that is formed as an electrical insulator. The insulation sheet 70 is disposed between the cap plate 40 and the electrode assembly 10 and between the electrode assembly 10 and the case 30.

For example, the insulation sheet 70 electrically insulates the electrode assembly 10 and the case 20 by being bent in a direction (z-axis direction) that crosses the cap plate 40 at internal opposite sides of the cap plate 40 while electrically insulating between the cap plate 40 and the electrode assembly 10.

The insulation sheet 70 includes an upper portion 71 that electrically insulates the electrode assembly 10 by surrounding the same in the internal space of the cap plate 40 and the case 30, a side portion 72, and a spacing portion 73.

The upper portion 71 is disposed between the cap plate 40 and the electrode assembly 10, and the side portion is bent in the z-axis direction from opposite ends of the upper portion 71 in the width direction (x-axis direction) of the cap plate 40 and then disposed between the side surface of the electrode assembly 10 and the case 30. The spacing portion 73 is formed along the opening 31 while connecting the upper portion 71 and the side portion 72, and is separated from a side corner of the welding line SL that welds the case 30 and the cap plate 40.

The upper portion 71 and the side portion 72 are electrically insulated. The spacing portion 73 is spaced from the side corner of the welding line WL while maintaining insulation performance of the insulation sheet 70, and prevents the insulation sheet 70 from being damaged or melted by welding heat.

That is, the spacing portion 73 sets a space S (refer to FIG. 3) that is distanced from the insulation sheet 70 at a corner of the case 30 and the cap plate 40. The space S extends along the y-axis direction. Thus, the insulation sheet 70 can prevent damage and melting along the y-axis direction at opposite sides of the x-axis direction.

For example, the insulation sheet 70 may be formed of polypropylene (PP) having a melting temperature of 170-180° C. In addition, the insulation sheet 70 may have a thickness of 80 µm for a sufficient insulation property with respect to electricity, and accordingly, a space occupied by the insulation sheet 70 in the case 30 can be minimized.

As described, the insulation sheet 70 is disposed between the electrode assembly 10 and the cap plate 40. In addition, the top insulator 20 is disposed between the electrode assembly 10 and the insulation sheet 70 and between the electrode assembly 10 and the electrode terminals 51 and 52. The top insulator 20 electrically insulates the electrode assembly 10 and the electrode terminals 51 and 52.

In addition, the top insulator 20 includes a plate portion 22 disposed on the electrode assembly 10 and an expansion portion 23 expanded toward the welding line WL at opposite sides in the width direction (x-axis direction) of the plate portion 22 and extended in the y-axis direction.

The upper portion 71 in the insulation sheet 70 includes a first internal electrolyte injection opening 281 that corresponds to the electrolyte injection opening 42, a first internal vent hole 481 that corresponds to the vent hole 41, and internal terminal holes 581 and 582 that correspond to the electrode terminals 51 and 52.

The plate portion 22 of the top insulator 20 includes a second internal electrolyte injection opening 282 corresponding to the first internal electrolyte injection opening 281 and a second internal vent hole 482 corresponding to the first internal vent hole 481. The electrode assembly 10 is welded to the electrode terminals 51 and 52 via the expansion portion 23 of the top insulator 20.

That is, the first and second internal electrolyte injection openings 281 and 282 are formed sequentially corresponding to the electrolyte injection opening 42 formed in the cap plate 40, and thus the electrolyte solution having passed through the electrolyte injection opening 42 is smoothly transmitted and injected into the insulation sheet 70 and the electrode assembly 10 below the top insulator 20.

Since the first and second internal vent holes 481 and 482 are formed sequentially corresponding to the vent hole 41 provided in the cap plate 40, the gas and internal pressure generated from the electrode assembly 10 can be smoothly transmitted and discharged to the vent hole 41 via the top insulator 20 and the insulation sheet 70.

Figure 4:
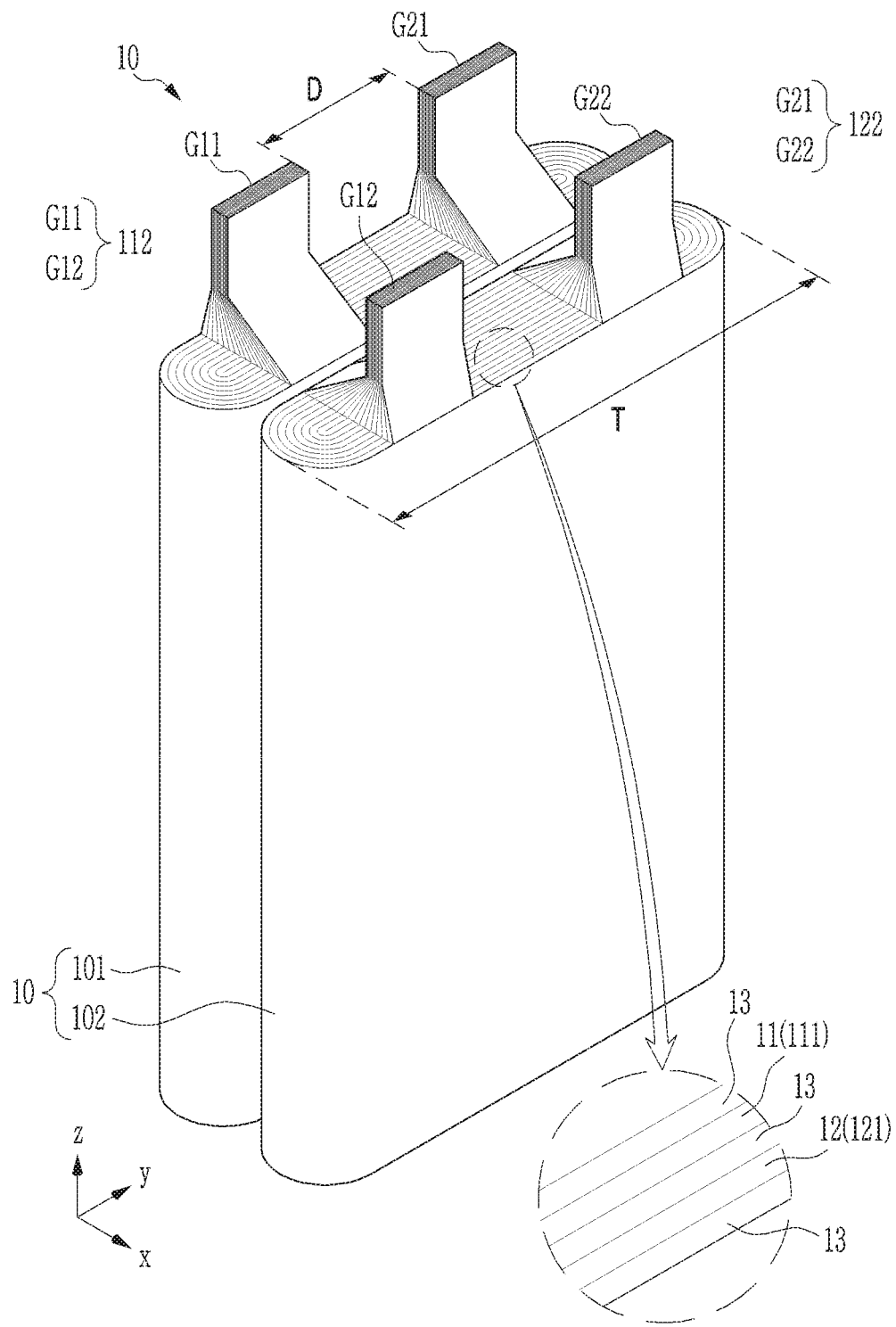
FIG. 4 is a perspective view of an electrode assembly applied to FIG. 3.
Figure 5:
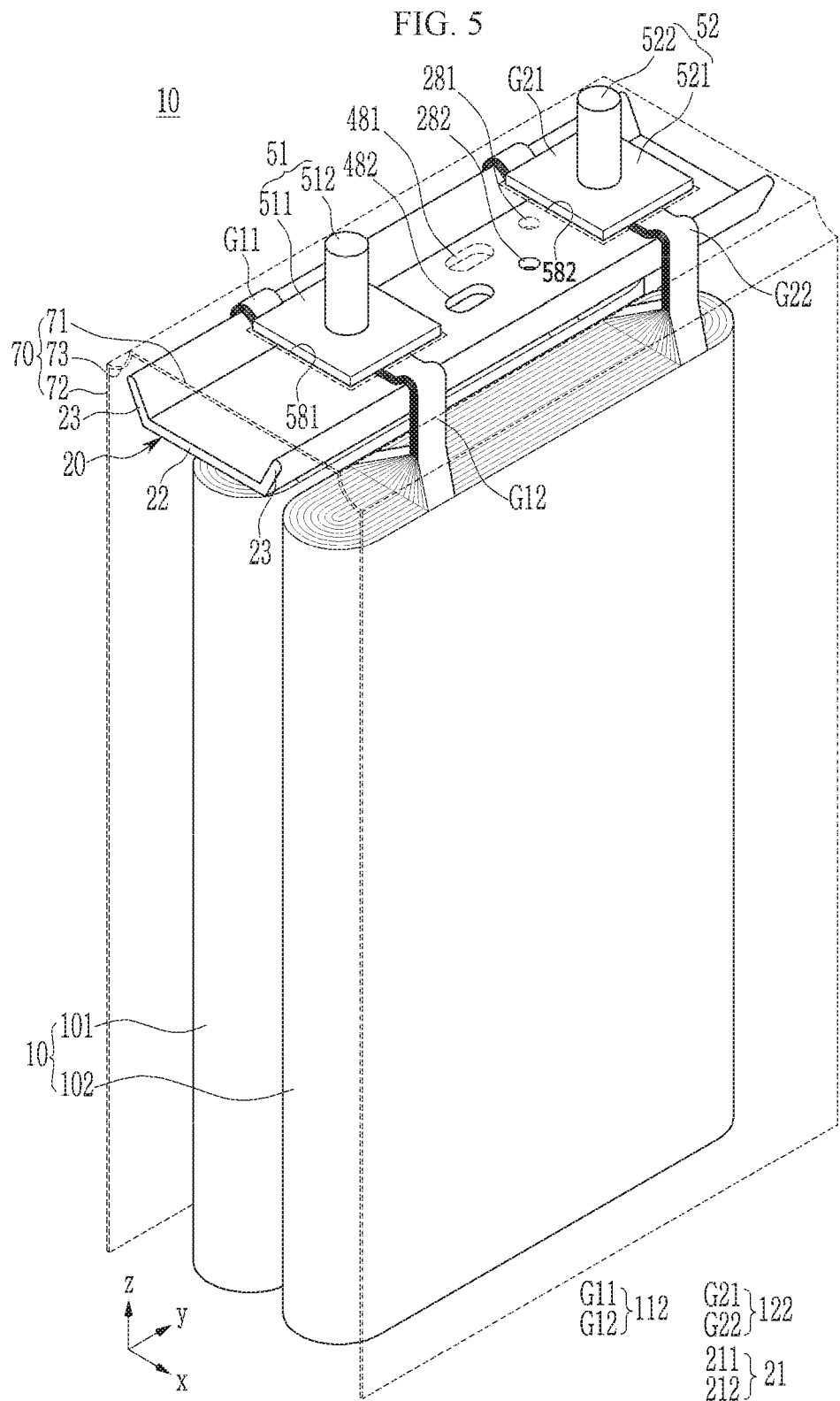
FIG. 5 is a perspective view of a state in which an electrode terminal is connected to the electrode assembly of FIG. 3 and then an insulation sheet is coupled thereto.

FIG. 4 is a perspective view of the electrode assembly applied to FIG. 3, and FIG. 5 is a perspective view of a state in which the electrode terminal is connected to the electrode assembly of FIG. 3 and to which the insulation sheet is coupled.

Referring to FIG. 4 and FIG. 5, the electrode assembly 10 is provided with a first electrode 11 (e.g., a negative electrode) and a second electrode 12 (e.g., a positive electrode) at opposite sides of a separator 13, which is an electrical insulator, and is formed by spirally winding or stacking (not shown) the negative electrode 11, the separator 13, and the positive electrode 12.

The negative and positive electrodes 11 and 12 include coated areas 111 and 121 where an active material is coated to a current collector of a metal film (e.g., a Cu or Al foil), and non-coated area tabs 112 and 122, each formed of a current collector exposed because an active is not coated thereto. The non-coated area tabs 112 and 122 are disposed at one end of the electrode assembly 10, while having a distance D within one spiral-winding range T of the electrode assembly 10.

That is, the non-coated area tabs 112 of the negative electrode 11 are disposed at one side (the left side in FIG. 4) in one end of the electrode assembly 10, and the non-coated area tab 122 of the positive electrode 12 are disposed at the other end (i.e., the right side in FIG. 4) while having the distance D from the same end (i.e., the upper end of FIG. 4) of the spirally-wound electrode assembly 10.

In addition, the non-coated area tabs 112 and 122 are provided one by one in each spiral-winding cycle of the electrode assembly 10 such that a charge and discharge current flows, total resistance of the non-coated area tabs 112 and 122 can be reduced. Accordingly, the electrode assembly 10 can charge and discharge a high current through the non-coated area tabs 112 and 122.

The electrode assembly 10 may be provided singularly (not shown), but in the first exemplary embodiment, two electrode assemblies 10 are formed. That is, the electrode assembly 10 includes a first assembly 101 and a second assembly 102 that are disposed in parallel with each other in a second direction (x-axis direction).

In addition, the first and second assemblies 101 and 102 may be formed in the shape of a plate that forms a semicircle at opposite ends in the y-axis direction to receive the rectangular parallelepiped-shaped case 30. The first and second assemblies 101 and 102 are received in an internal space of the case 30 and the cap plate 40 set by the first, second, and third lengths L1, L2, and L3. The electrode assembly 10, that is, the first and second assemblies 101 and 102, are disposed in parallel.

The electrode terminals 51 and 52 are respectively provided in the terminal holes H1 and H2 of the cap plate 40, and thus are electrically connected to the first and second assemblies 101 and 102 through the non-coated area tabs 112 and 122 such that a current can be discharged from the first and second assemblies 101 and 102 or charged to the first and second assemblies 101 and 102.

Referring to FIG. 1 to FIG. 3 and FIG. 5, the electrode terminals 51 and 52 may be formed with the same structure. For example, the electrode terminals 51 and 52 include internal plates 511 and 521 and external plates 513 and 523.

The electrode terminals 51 and 52 are electrically connected with the cap plate 40 by disposing gaskets 621 and 622 between the electrode terminals 51 and 52 and an internal surface of the cap plate 40. Internal sides of the gaskets 621 and 622 are closely attached to the cap plate 40 through one sides thereof, and the gaskets 621 and 622 are supported by the internal plates 511 and 521 of the electrode terminals 51 and 52 through the other sides thereof, thereby stabilizing a connection structure of the electrode terminals 51 and 52 and the non-coated area tabs 112 and 122.

The gaskets 621 and 622 are provided between rivet portions 512 and 522 of the electrode terminals 51 and 52 and the terminal holes H1 and H2 of the cap plate 40 to seal between the rivet portions 512 and 522 and the terminal holes H1 and H2 of the cap plate 40 and electrically insulate therebetween.

The rivet portions 512 and 522 are inserted into the terminal holes H1 and H2 by disposing the gaskets 621 and 622 therebetween, the external plates 513 and 523 are inserted into coupling holes 514 and 524 by disposing external insulation members 631 and 632 therebetween, and then the peripheries of the coupling holes 514 and 524 are caulked or welded such that the rivet portions 512 and 522 can be fixed to the external plates 513 and 523. Accordingly, the electrode terminals 51 and 52 can be provided with an insulation and sealing structure in the cap plate 40.

As described, the rivet portions 512 and 522 are provided in the terminal holes H1 and H2 and then protrude to the outside the cap plate 40. The rivet portions 512 and 522 are connected with the internal plates 511 and 521 in an inner side of the cap plate 40, and are connected to the external plates 513 and 523 at an outer side of the cap plate 40.

That is, the rivet portions 512 and 522 mechanically and electrically connect the internal plates 511 and 521 and the external plates 513 and 523. In addition, the rivet portions 512 and 522 and the internal plates 511 and 521 are connected with the non-coated area tabs 112 and 122 at an inner side of the cap plate 40.

Figure 6:
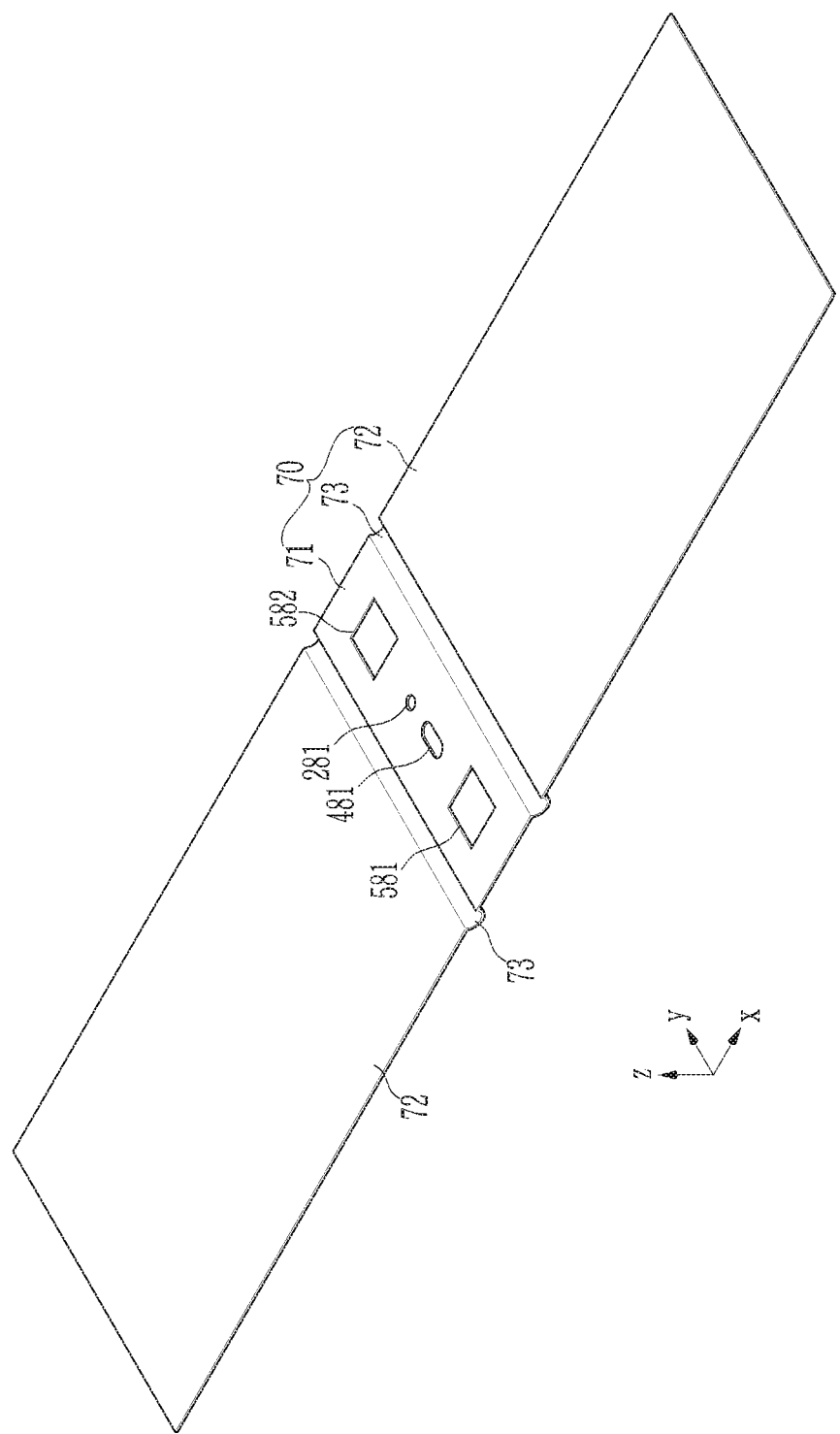
FIG. 6 is a perspective view of the insulation sheet in an unfolded view applied to FIG. 5.

FIG. 6 is a perspective view of the insulation sheet applied to FIG. 5 in an unfolded view. Referring to FIG. 2 to FIG. 6, the non-coated area tabs 112 and 122 may be provided in a plurality of groups. The non-coated area tabs 112 and 122 are connected to the internal plates 511 and 521 of the electrode terminals 51 and 52 by welding via the expansion portion 23 provided at opposite sides of the top insulator 20 in the second direction (x-axis direction).

For example, the non-coated area tabs 112 and 122 include first tab groups G11 and G21 and second tab groups G12 and G22. The first tab groups G11 and G21 are respectively connected to the negative and positive electrodes 11 and 12 of the first assembly 101, and the second tab groups G12 and G22 are respectively connected to the negative and positive electrodes 11 and 12 of the second assembly 102.

The first tab groups G11 and G21 are bent toward the opposite side from one side of the second direction (x-axis direction), and are thus connected to the inner plates 511 and 521 of the electrode terminals 51 and 52. The second tab groups G12 and G22 are bent toward the first group groups G11 and G21 at the opposite side in the second direction (x-axis direction), and are then connected to the inner plates 511 and 521 of the electrode terminals 51 and 52.

The first tab groups G11 and G21 and the second tab groups G12 and G22 are respectively disposed at opposite sides in the second direction (x-axis direction) at a center of a third direction (y-axis direction), and are then welded to bottom sides of the inner plates 511 and 521 of the electrode terminals 51 and 52.

Referring back to FIG. 2 and FIG. 3, the spacing portion 73 in the insulation sheet 70 is distanced toward the expansion portion 23 at the side corner of the welding line WL. That is, the spacing portion 73 is supported by the non-coated area tabs 112 and 122 that surround the expansion portion 23. In this case, the spacing portion 73 is distanced apart from the welding line WL by as much as a curvature radius R having the side corner of the welding line WL as a center.

When the insulation sheet 70 is disposed between the cap plate 40 and the electrode assembly 10 and the side portion 72 of the insulation sheet 70 is bent, a point where the upper portion 71 and the spacing portion 73 are connected functions as a first hinge point P1, and a point where the side portion 72 and the spacing portion 73 are connected functions as a second hinge point P2, such that the insulation sheet 70 surrounds the electrode assembly 10.

As shown in FIG. 6, when the insulation sheet 70 is in an unfolded state, the spacing portion 73 is formed as a groove that protrudes toward a direction (i.e., a downward direction) that faces the electrode assembly 10. Thus, when the insulation sheet 70 is bent, the insulation sheet 70 is bent at the first and second hinge points P1 and P2 and thus the spacing portion 73 that is formed as a groove becomes apart from the side corner of the welding line WL.

That is, the spacing portion 73 removes a virtual vertex formed by the upper portion 71 and the side portion 72 and faces toward the electrode assembly 10. That spacing portion 73 sets a space S that is distanced from the insulation sheet 70 at a corner of the case 30 and the cap plate 40. In such a state, welding heat transmitted to the inside from the welding line WL cannot reach the spacing portion 73 and is thus dispersed and cooled in the space S between the spacing portion 73 and the welding line WL.

Accordingly, the insulation sheet 70 can stably maintain a structure that surrounds the electrode assembly 10, and the non-coated area tabs 112 and 122 and the electrode assembly 10 can be effectively prevented from being short-circuited with the cap plate 40 or the case 30 due to an external cause during use of the rechargeable battery.

Hereinafter, various exemplary embodiments of the present invention will be described. Compared to the first exemplary embodiment and the above-described exemplary embodiment, the same configurations will not be described and different configurations will be described.

Figure 7:
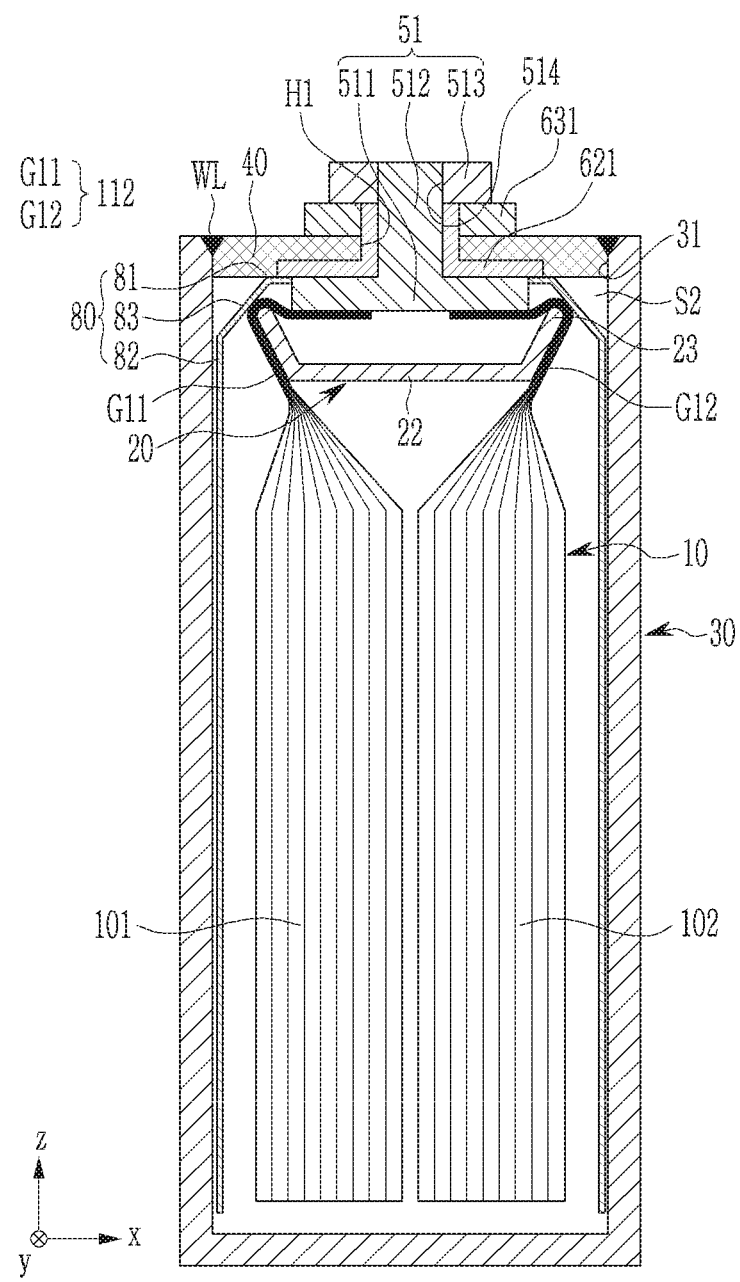
FIG. 7 is a partial cross-sectional view of a rechargeable battery according to a second exemplary embodiment of the present invention.

FIG. 7 is a partial cross-sectional view of a rechargeable battery according to a second exemplary embodiment of the present invention. Referring to FIG. 7, in a rechargeable battery 2 of the second exemplary embodiment, a spacing portion 83 of an insulation sheet 80 is distanced apart from a side corner of a welding line WL by as much as the size of a triangle that is formed while having a welding line WL of a case 30 and a cap plate 40 as a vertex. That is, the spacing portion 83 is supported by non-coated area tabs 112 and 122 that surround the expansion portion 23.

That is, the spacing portion 83 removes a virtual vertex of an upper portion 81 and a side portion 82 and faces toward the electrode assembly 10. The spacing portion 83 sets a space S2 that is distanced from the insulation sheet 80 at a corner between the case 30 and the cap plate 40. In such a state, welding heat transmitted to the inside from the welding line WL cannot reach the spacing portion 83 and thus is dispersed and cooled in the space S2 between the spacing portion 83 and the welding line WL.

Thus, the insulation sheet 80 can stably maintain a structure that surrounds the electrode assembly 10, and the non-coated area tabs 112 and 122 and the electrode assembly 10 can be effectively prevented from being short-circuited with the cap plate 40 or the case 30 due to an external cause during use of the rechargeable battery 2.

Figure 8:
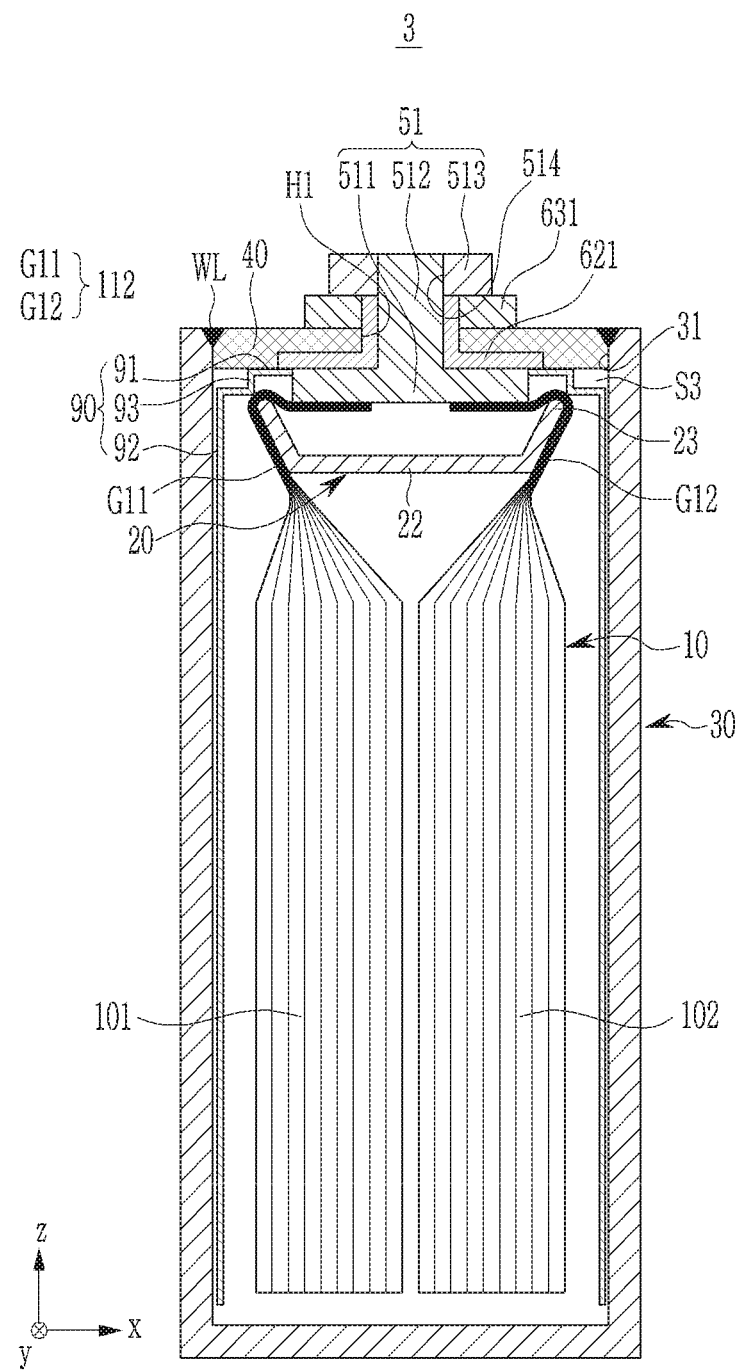
FIG. 8 is a partial cross-sectional view of a rechargeable battery according to a third exemplary embodiment of the present invention.

FIG. 8 is a partial cross-sectional view of a rechargeable battery according to a third exemplary embodiment of the present invention. Referring to FIG. 8, in a rechargeable battery 3 of the third exemplary embodiment, a spacing portion 93 of an insulation sheet 90 is distanced apart from a side corner of a welding line WL by as much as the size of a quadrangle that is formed while having a welding line WL of a case 30 and a cap plate 40 as a vertex. That is, the spacing portion 93 is supported by non-coated area tabs 112 and 122 that surround the expansion portion 23.

That is, the spacing portion 93 removes a virtual vertex of an upper portion 91 and a side portion 92 and faces toward the electrode assembly 10. The spacing portion 93 sets a space S3 that is distanced from the insulation sheet 90 at a corner between the case 30 and the cap plate 40. In such a state, welding heat transmitted to the inside from the welding line WL cannot reach the spacing portion 93 and thus is dispersed and cooled in the space S3 between the spacing portion 93 and the welding line WL.

Thus, the insulation sheet 90 can stably maintain a structure that surrounds the electrode assembly 10, and the non-coated area tabs 112 and 122 and the electrode assembly 10 can be effectively prevented from being short-circuited with the cap plate 40 or the case 30 due to an external cause during use of the rechargeable battery 3.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

DESCRIPTION OF SYMBOLS

| | |
|---|---|
| 10: electrode assembly | 11: first electrode (negative electrode) |
| 12: second electrode (positive electrode) | 13: separator |
| 20: top insulator | 22: plate portion |
| 23: expansion portion | 30: case |
| 31: opening | 40: cap plate |
| 41: vent hole | 42: electrolyte injection opening |
| 51, 52: electrode terminal | 70, 80, 90: insulation sheet |
| 71, 81, 91: upper portion | 72, 82, 92: side portion |
| 73, 83, 93: spacing portion | 101, 102: first, second assembly |
| 111, 121: coated area | 112, 122: non-coated area tab |
| 281, 282: first, second internal electrolyte injection opening | |
| 411: vent plate | |
| 412: notch | 421: sealing cap |
| 481, 482: first, second inner vent hole | 511, 521: inner plate |
| 512, 522: rivet portion | 513, 523: external plate |
| 514, 524: coupling hole | 581, 582: internal terminal hole |
| 621, 622: gasket | 631, 632: external insulation member |
| D: distance | G11, G21: first tab group |
| G12, G22: second tab group | |
| H1, H2: terminal hole | |
| L1: first length (height) | |
| L2: second length (width) | L3: third length (length) |
| P1, P2: first, second hinge point | R: curvature radius |
| S, S2, S3: space | T: one spiral-wound range |
| WL: welding line | |

The invention claimed is:

1. A rechargeable battery comprising:
   an electrode assembly with a non-coated area tab that protrudes to one side of a coated area;
   a case defining an opening at one side thereof to receive the electrode assembly;
   a cap plate coupled and welded to the opening, the cap plate having a length and a width with a first end and a second end at opposite ends of the width, wherein the first end and the second end of the cap plate are each welded to the case at respective side edges where the cap plate and case intersect;
   an electrode terminal in the cap plate and electrically connected to the non-coated area tab; and
   an insulation sheet for insulating the electrode assembly extending along the length of the cap plate between the cap plate and the electrode assembly, and comprising a first bend extending along and adjacent to the first end of the cap plate and a second bend extending along and adjacent to the second end of the cap plate,
   wherein the insulation sheet comprises spacing portions distanced from respective side edges, and
   wherein the spacing portions extend along the entire length of the first and second ends of the cap plate, respectively, and are on the first bend and the second bend, respectively.

2. The rechargeable battery of claim 1, wherein the insulation sheet comprises:
   an upper portion between the cap plate and the electrode assembly; and
   side portions bent from the upper portion at the first and second ends of the cap plate, respectively, and between side surfaces of the electrode assembly and the case, and
   the spacing portions connecting the upper portion and the side portions.

3. The rechargeable battery of claim 2, further comprising a top insulator between the coated area and the insulation sheet and between the coated area and the electrode terminal,
   wherein the top insulator comprises:
   a plate portion on the electrode assembly, and
   expansion portions extending toward the side edges.

4. The rechargeable battery of claim 3, wherein the non-coated area tab extends around the expansion portion to be welded to the electrode terminal, and
   the spacing portions are distanced toward the expansion portions from the side edges.

5. The rechargeable battery of claim 4, wherein one of the spacing portions is supported by the non-coated area tab that surrounds a respective expansion portion.

6. A rechargeable battery comprising:
   an electrode assembly with a non-coated area tab that protrudes to one side of a coated area;
   a case defining an opening at one side thereof to receive the electrode assembly;
   a cap plate coupled and welded to the opening, the cap plate having a length and a width with a first end and a second end at opposite ends sides of the width, wherein the first end and the second end of the cap plate are each welded to the case at respective side edges where the cap plate and case intersect;
   an electrode terminal in the cap plate and electrically connected to the non-coated area tab; and an insulation sheet for insulating the electrode assembly extending along the length of the cap plate between the cap plate and the electrode assembly, and comprising a first bend extending along and adjacent to the first end of the cap plate and a second bend extending along and adjacent to the second end of the cap plate, a top insulator between the coated area and the insulation sheet and between the coated area and the electrode terminal, wherein the insulation sheet comprises:
an upper portion between the cap plate and the electrode assembly; and
side portions bent from the upper portion at the first and second ends of the cap plate, respectively, and between side surfaces of the electrode assembly and the case, and
spacing portions distanced from respective side edges where the cap plate and case intersect, the spacing portions connecting the upper portion and the side portions;
wherein the spacing portions are on the first bend and the second bend, respectively;

wherein the top insulator comprises:
a plate portion on the electrode assembly, and
expansion portions extending toward the side edges;

wherein, in the insulation sheet, the upper portion defines:
a first internal electrolyte injection opening corresponding to an electrolyte injection opening in the cap plate;
a first internal vent hole corresponding to a vent hole in the cap plate; and
an internal terminal hole corresponding to the electrode terminal.

7. The rechargeable battery of claim 6, wherein the top insulator comprises:

a second internal electrolyte injection opening corresponding to the first internal electrolyte injection opening; and a second internal vent hole corresponding to the first internal vent hole.

8. The rechargeable battery of claim 2, wherein, in a cross-sectional view perpendicular to the length of the cap plate, the spacing portions are distanced from their respective side edges by a radius of curvature in which the side edge is viewed as the center of curvature.

9. The rechargeable battery of claim 2, wherein, in a cross-sectional view perpendicular to the length of the cap plate, each of the spacing portions along with the cap plate and the case define a respective triangular shape, in which each respective side edge defines one vertex of the respective triangular shape, the spacing portions each define one side of the respective triangular shape and the cap plate and the case define the remaining two sides of each respective triangular shape.

10. The rechargeable battery of claim 2, wherein, in a cross-sectional view perpendicular to the length of the cap plate, each of the spacing portions along with the case and the cap plate define a respective quadrangular shape, in which each spacing portion defines two sides of the respective quadrangular shape and the cap plate and the case define the remaining two sides of each respective quadrangular shape.

* * * * *